United States Patent [19]

Castille

[11] 4,392,770

[45] Jul. 12, 1983

[54] PIPE HANDLING APPARATUS

[76] Inventor: Dale J. Castille, P.O. Box 2697, Lafayette, La. 70502

[21] Appl. No.: 200,070

[22] Filed: Oct. 23, 1980

[51] Int. Cl.³ .............................................. B65G 39/02
[52] U.S. Cl. ..................................... 414/432; 198/782
[58] Field of Search ............................... 414/431–433, 414/745, 748; 198/782

[56] References Cited

U.S. PATENT DOCUMENTS 3,321,291  5/1967  Smith ............................. 414/745 X
4,253,792  3/1981  Nishikawa ...................... 414/431 X Primary Examiner—Robert G. Sheridan
Attorney, Agent, or Firm—Guy E. Matthews

[57] ABSTRACT

Pipe, bar stock, or other tubular member handling apparatus according to this invention includes means for elevating a section of pipe from a horizontal pipe rack, moving the pipe linearly into operative relation with a machine that rotates the pipe and does work such as machining threads at the end of the pipe, supporting the pipe for rotation during machining operations, moving the pipe linearly in the opposite direction after machining operations have been completed and then lowering the pipe back onto the pipe rack. The machine incorporates operation and control circuitry correlating certain pipe control movements and facilitating pipe handling with minimum control selection by operating personnel and minimizing handling time. An adjustable, limit switch-controlled electrohydraulic control circuit enables utilization of the machine for pipes of different size and further enables simple and efficient positioning of the center line of the pipe in colinear relation with the center line of the pipe handling machine.

15 Claims, 15 Drawing Figures

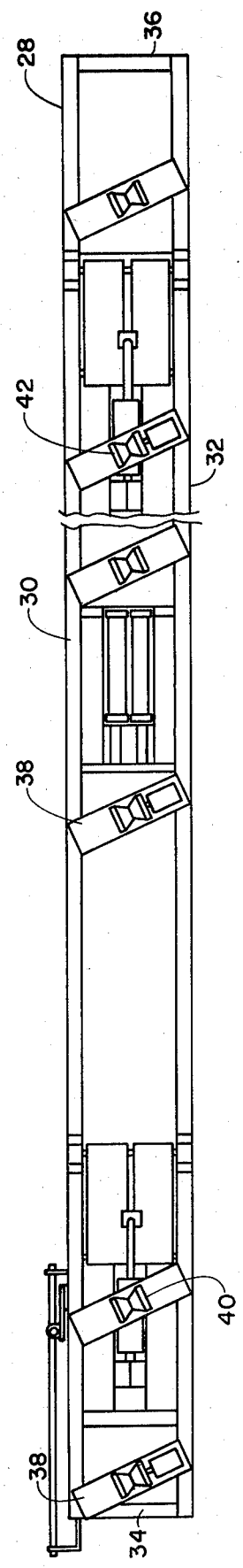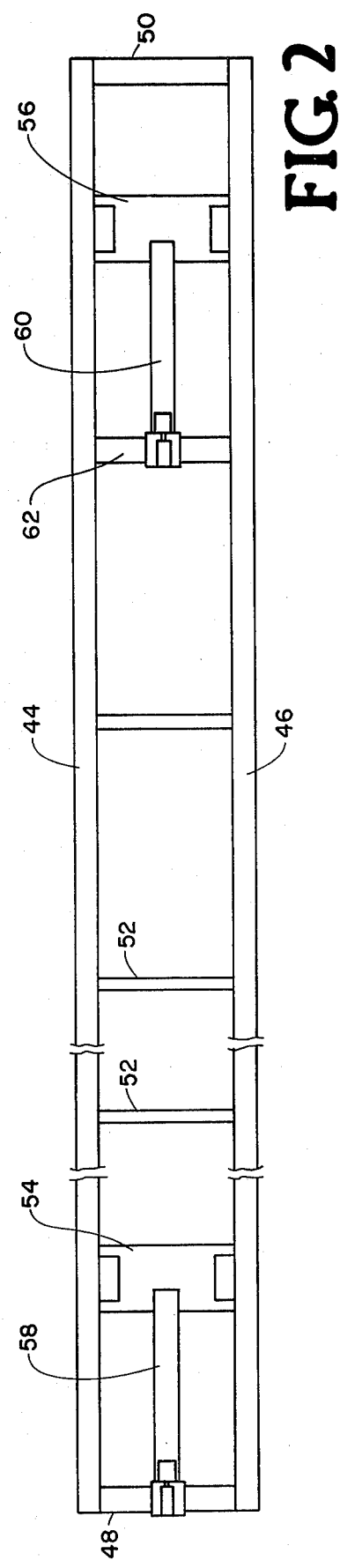

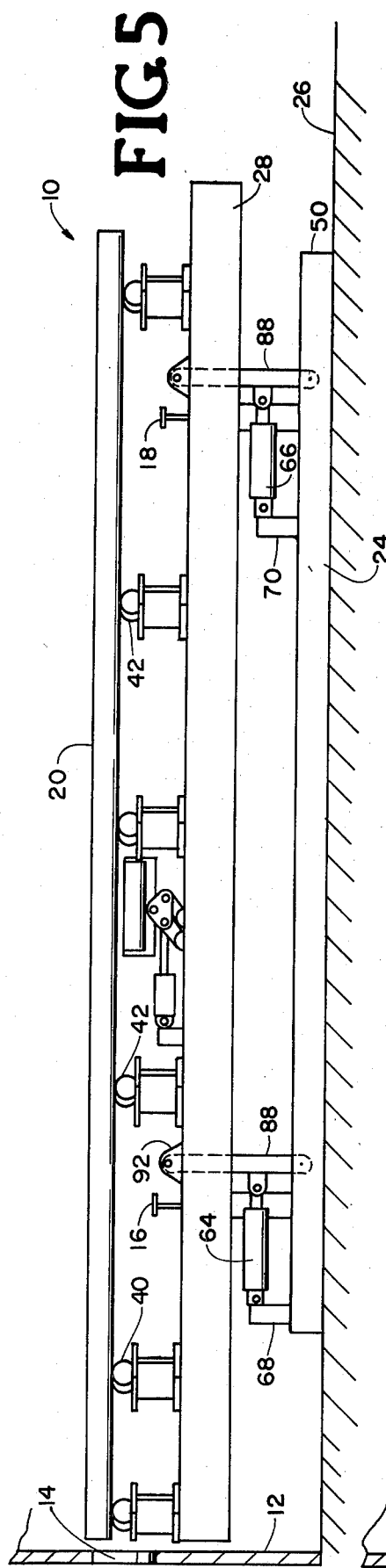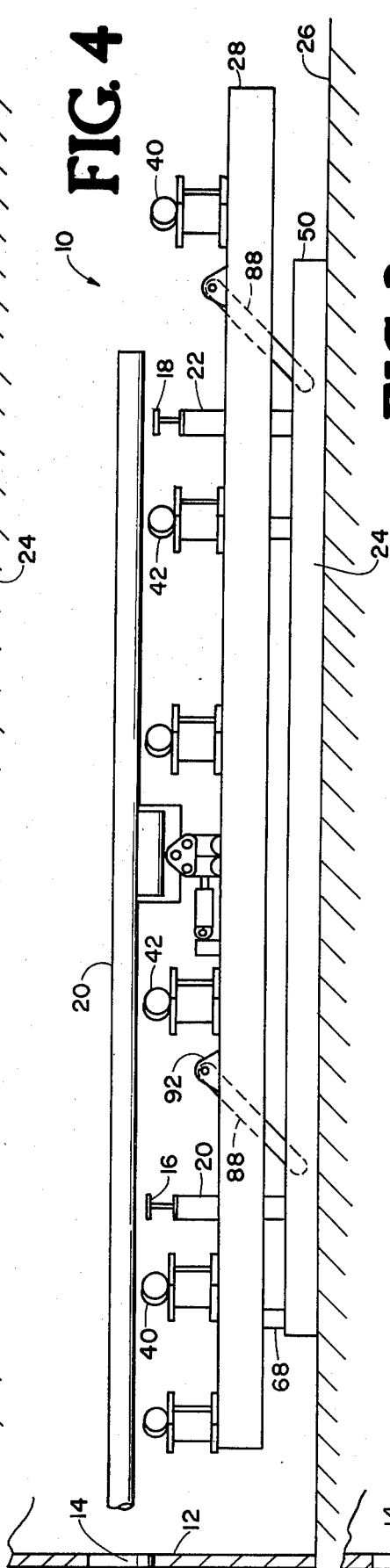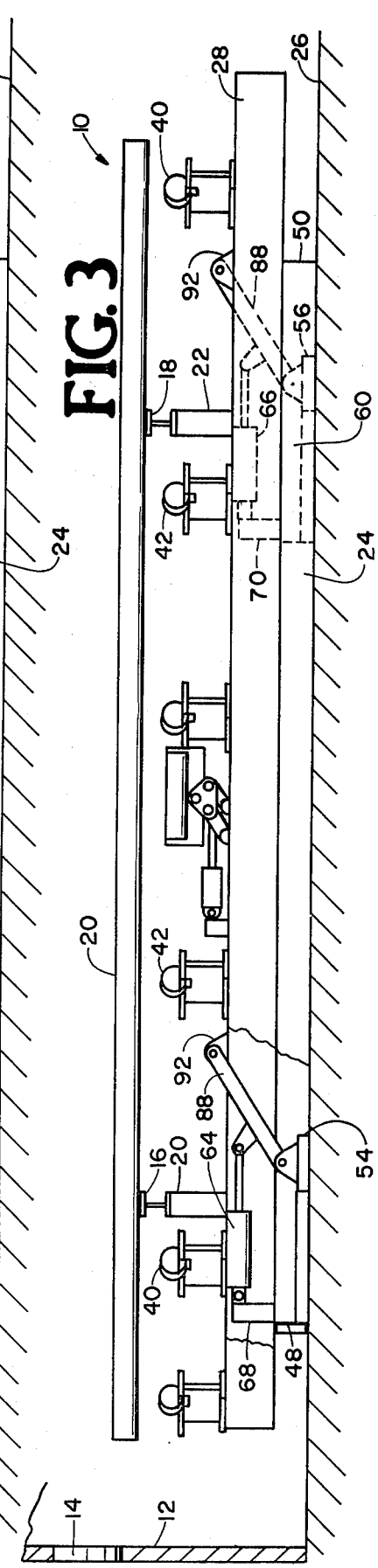

PIPE HANDLING APPARATUS

FIELD OF THE INVENTION

This invention relates generally to pipe handling apparatus for the purpose of conducting working operations thereon, and is more specifically related to pipe handling apparatus adapted to transport pipe in linear manner from a horizontally disposed pipe rack to a machine for working operations such as thread cutting, thread cleaning, pipe joint machining, etc., and then returning the finished pipe back to the pipe rack for storage or further operations, as desired.

BACKGROUND OF THE INVENTION

In the manufacture of pipe, raw pipe is provided in sections and then the extremities thereof are prepared for the particular type of connection that is to be made. Where pipe sections are to be interconnected by collars, each end of the pipe sections are externally threaded for connection to the internal threads of the collars. Under circumstances where pipe is to be prepared for weld connection, the ends of the pipe sections are beveled in proper manner to receive deposit of weld metal that establishes connection between the pipe joints. In some cases, such as in the manufacture of drill pipe, one extremity of each pipe section is formed to define an internally threaded connection box, while the opposite extremity thereof is externally threaded to define a pin connection. Thus, each pipe joint, including its threaded portions, is integral and individual pipe sections may be connected one to the other simply by threading and unthreading them without any interference and complications that might be caused by connection collars and the like.

In many cases, pipe is of fairly light-weight nature and is readily handled by operating personnel who might roll it laterally on a pipe rack into substantial alignment with a machine and then slide the pipe linearly into operative relation with the machine. In many cases, however, the pipe to be subjected to machining or working operations is of extremely heavy nature and must be handled mechanically. For example, heavy walled well casing may weigh in the order of 350 pounds per foot, thereby causing 25-35 foot sections thereof to weigh in the order of 8,750 pounds to 12,250 pounds. Obviously, mechanized apparatus is required to handle heavy pipe of this nature and provide efficient support for the pipe while it is being rotated during machining operations.

Although in some cases pipe working machines are set up to handle a particular size of pipe, in many cases machines must be capable of providing machining operations on pipes of various size. Further, it is necessary, regardless of the size of the pipe, that the pipe center be located in coextensive relation with the center line of the machine during machining operations. It is desirable, therefore, to provide pipe handling apparatus that ensures efficient and accurate positioning of pipes of differing size so that the center lines thereof are always coextensive with the center line of the machine.

It is therefore a primary feature of the present invention to provide novel pipe handling apparatus having the capability of handling pipes of various sizes and yet ensuring accurate positioning of the center lines thereof in coextensive relation with the center line of a machine to which the pipes are conducted for machining operations.

It is also a feature of this invention to provide novel pipe handling apparatus having the capability of providing efficient handling for extremely heavy pipes during movement of the pipes being handled and yet ensure the provision of adequate and proper support for the pipes during machining operations.

It is an even further feature of this invention to provide novel control circuitry for pipe handling apparatus thus ensuring simple and efficient handling of the pipes and minimizing handling time during pipe handling and machining operations.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

Pipe handling apparatus according to the present invention includes a base structure which may be also referred to as a skid and which is adapted to rest on a horizontal surface such as the ground, the floor of a building, etc. To the base structure is movably interconnected a mobile support structure which is movable upwardly and downwardly relative to the base structure. Pivotal link elements which are energized by means of hydraulic actuators are pivotally interconnected with both the base structure and the movable support structure with the connecting links being pivoted in order to cause raising and lowering movement of the movable support.

A plurality of pipe engaging rollers are supported in elevated manner above the movable support structure and are adapted, upon raising of the movable support structure to engage a pipe lying on a pipe rack and lift the pipe upwardly from the pipe rack. At least some of these pipe engaging rollers are of driven nature and, upon being driven, induce linear movement to the pipe to move one end of the pipe into a work area where work, such as threading operations, end facing operations, etc., are conducted. Each of the pipe engaging rollers is angulated with respect to the pipe engaged thereby and, upon being rotated, induce spiral linear motion to the pipe, driving it linearly to or from the work area or station.

A pair of axial support rollers, positioned in side by side relationship, are pivotally interconnected with the movable support structure and are adapted to be raised and lowered relative to the movable support structure and the pipe engaging rollers interconnected therewith. In the raised position, the axial support rollers engage the pipe and position it with the center line thereof in coaxial relationship with the center line of the machine accomplishing machining operations thereon. The parallel axial support rollers are of freely rotating nature and simply function to provide adequate support for the pipe during rotation thereof during machining operations.

The axial support rollers are raised and lowered by means of a plurality of pivotal connecting links that are interconnected with the movable support structure and are pivoted relative thereto upon raising and lowering by means of a linear hydraulic actuator. The upper extremities of these roller operating links are pivotally interconnected with a roller support plate structure which is maintained in substantially parallel relation with the movable support structure during raising and lowering of the axial support rollers. Further, the axial support rollers are interconnected with the horizontal base element by means of a transverse pivot structure, thereby allowing the rollers to seek optimum seating engagement with the pipe, to thus provide adequate support for the pipe during rotation thereof.

The invention includes electrical and hydraulic control circuitry that is integrated so as to provide simple and efficient controlled movement of the movable support structure and the axial support rollers so as to lift the pipe from the pipe rack, transport it to the work station for machining, remove the pipe from the work station and return it to the pipe rack.

To facilitate handling and accurate positioning of pipes of various sizes and yet ensure accurate positioning of the pipes with the center lines thereof in registry with the center line of the machine by which the pipes are to be worked, the control circuitry incorporates a mechanical cam structure that is selectively positionable in elevated relation with the base or skid structure of the pipe handling apparatus. To the movable support element is interconnected a vertically oriented limit switch support having a pair of electrical limit switches affixed thereon in closely spaced relation. The cam structure incorporates control surfaces that are engaged by the limit switches and which function to stop vertical movement of the movable support member by means of electrohydraulic control when the limit switches have been moved into a predetermined relationship relative to the cam structure. The cam structure is vertically adjustable relative to the base with regard to the dimension of the pipes to be handled, thereby ensuring precise location of the movable support member and thus location of the pipes in respect to the machine that accomplishes work thereon. The electrohydraulic control system in coordinated relation with the movable positioning cam structure also facilitates limited downward movement of the movable support member and controlled upward movement of the axial support rollers in response to positioning of the movable cam structure so that the pipe being worked will be accurately supported by the axial support rollers with the center line thereof in coextensive relation with the center line of the machine.

BRIEF DESCRIPTION OF THE DRAWINGS

So that the manner in which the above-recited features, advantages and objects of the present invention, as well as others which will become apparent, are attained and understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the drawings:

FIG. 1 is a plan view of pipe handling apparatus constructed in accordance with the present invention.

FIG. 2 is a plan view of the base frame structure or skid of the apparatus of FIG. 1.

FIG. 3 is a side view of the pipe handling apparatus of FIG. 1 with the movable frame thereof being illustrated in the fully lowered position.

FIG. 4 is a side view of the pipe handling apparatus of FIG. 1 positioned in a partly lowered position thereof and with pipe rotational support roller assembly thereof.

FIG. 5 is a side view of the pipe handling apparatus of FIG. 1 with the movable frame thereof being positioned in the fully raised condition thereof, being illustrated in the fully raised position and with pipe supported thereby being extended into the building structure.

FIG. 6 is a partial side view of the pipe handling apparatus of FIG. 1 illustrating an elevator leg and operator assembly thereof in detail.

FIG. 7 is a side view of the pipe rotational support roller mechanism illustrated in the fully upright position.

FIG. 8 is an end view of the pipe rotational support roller mechanism of FIG. 7.

FIG. 9 is a partial side view of the pipe handling mechanism of FIG. 1 illustrating the movable frame height and position controlling mechanism thereof in detail.

FIG. 10 is an end view taken along line 10—10 of FIG. 9.

FIG. 11 is a pictorial representation of the movable frame height and position controlling mechanism of FIGS. 9 and 10 with limit switches positioned at the automatic stop position.

Figure 11:
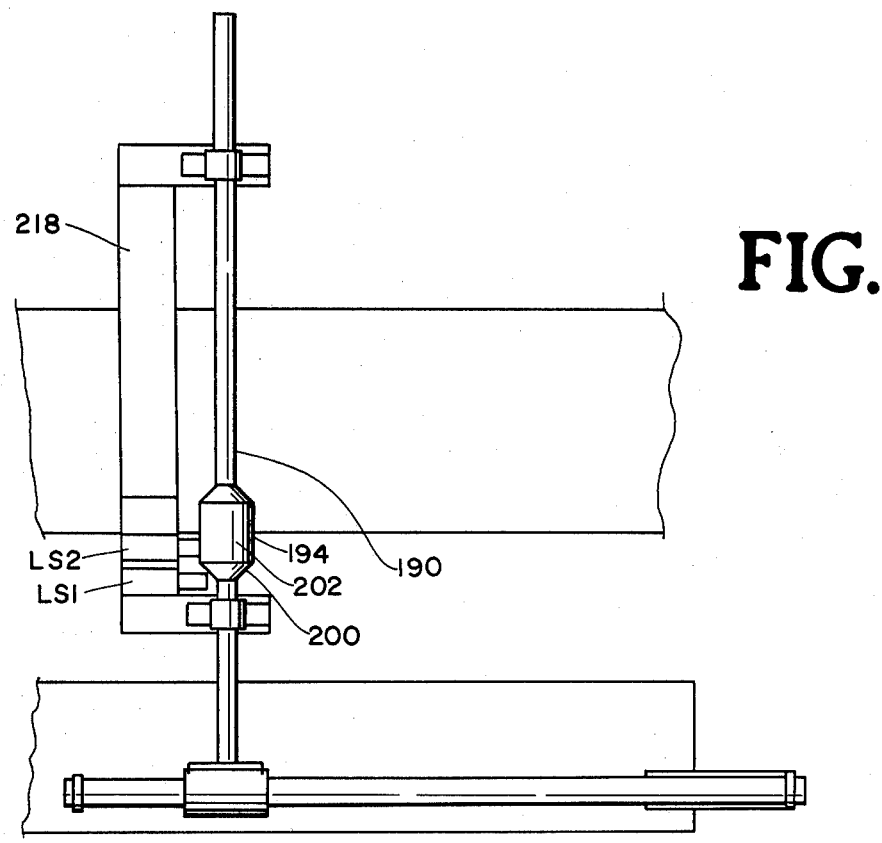
Figure 12:
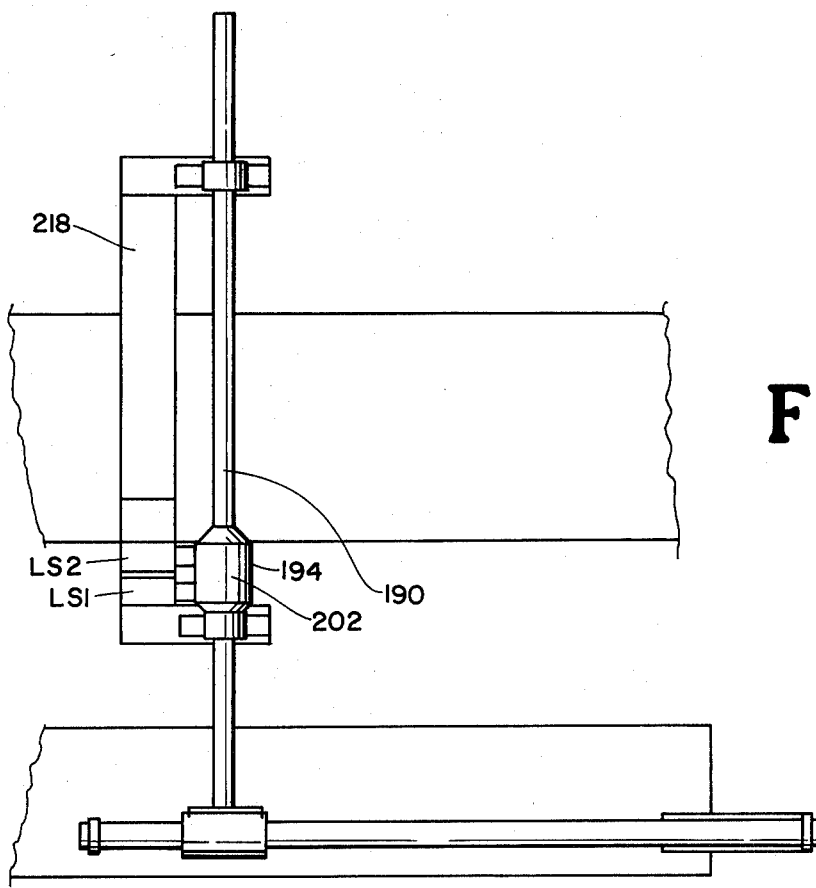

FIG. 12 is a pictorial representation similar to that of FIG. 11 illustrating the limit switches' positions so as to stop the movable frame at a partially lowered position.

Figure 13:
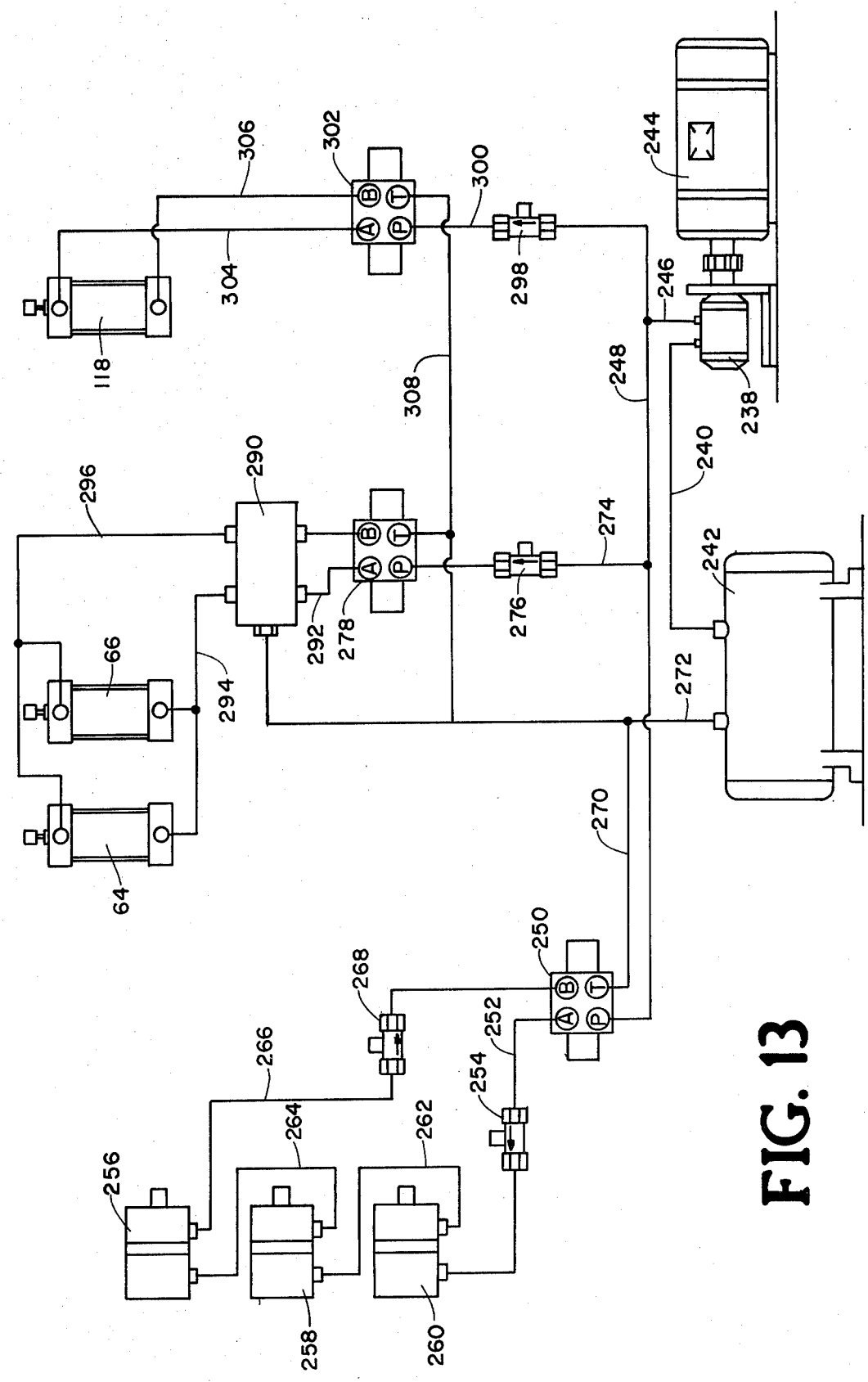

FIG. 13 is a hydraulic schematic illustration showing the hydraulic system for operation and control of the apparatus of this invention.

Figure 14:
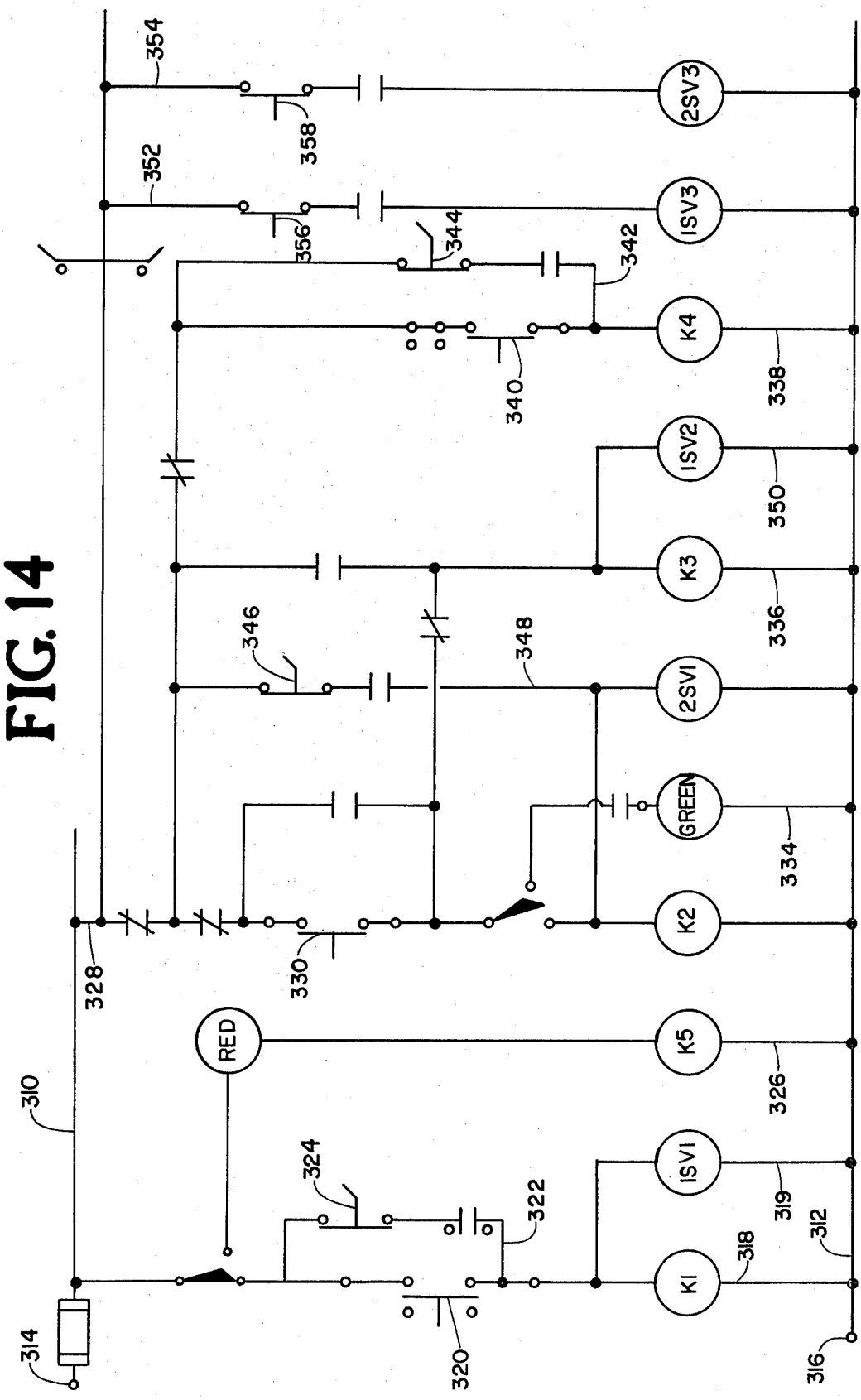

FIG. 14 is an electrical schematic illustration showing the electrical circuitry for operation and control of the apparatus of this invention.

DETAILED DESCRIPTION OF PREFERRED EMBODIMENT

Referring now to the drawings for a better understanding of this invention, and referring particularly to FIGS. 1 and 2, pipe handling apparatus manufactured in accordance with this invention is illustrated generally at 10 and is adapted to be positioned in close proximity to a building structure 12 within which is housed appropriate machinery for accomplishing work operations on the extremities of the pipe. The building structure is formed to define a pipe opening 14 of small dimension through which the pipe is projected in order to be received by the machinery for the purpose of accomplishing the work. Particularly, the machinery is adapted to thread the ends of the pipe, if threading operations are desired or, in the case of pipe adapted for connection by welding, the machinery is enabled to bevel the ends of the pipe in preparation for the welding operation. Although pipe may be stored indoors and the pipe handling apparatus 10 may also be located indoors, it is typically more practical to provide outdoor pipe racks on which the pipe may be stored and handled, thus limiting the overall cost of pipe storage, handling and machining operations. As shown in the various figures, a typical pipe rack incorporates horizontal beams 16 and 18 which may be of I-beam configuration as shown, and which are supported by upright support structures 20 and 22 which may be of any suitable form. The horizontal beams 16 and 18 provide support for a number of lengths of pipe 20. Regardless of the length and weight of the pipe 20, it is typically a relatively easy and simple task to move the pipe in parallel manner on the pipe rack simply by rolling it along the upper surfaces defined by the support beams 16 and 18. Movement of the pipe in linear manner, however, in order to bring one end thereof into working engagement with a machine located within the building structure 12 can be an extremely difficult task if manual movement of the pipe is required. For example, in some cases heavy walled well tubing of fairly large diameter can weigh in the 300 pounds per lineal foot. A thirty foot section of this tubing is therefore sufficiently heavy that linear movement is a virtual impossibility. It is desired to provide pipe handling apparatus having the capability of lifting the pipe from the pipe rack and transporting it linearly into operative machining relation with machines that accomplish work on the end portions of the pipe and which then returns the machined pipe back to the pipe rack. It is also desirable to provide pipe handling apparatus having the capability of handling any one of a number of various sizes and weights of pipe without requiring any modification of the pipe handling apparatus itself. In accordance with the present invention, such pipe handling apparatus conveniently takes the form illustrated generally at 10 wherein a base frame structure is illustrated at 24 and which is positionable in stationary manner upon any suitable surface such as the ground 26, a floor of a building, etc. For the purpose of achieving elevation of the pipe 20, the pipe handling mechanism incorporates a movable frame structure 28 which is movable between a fully lowered position illustrated in FIG. 3 and a fully raised position as illustrated in FIG. 5. As shown in FIG. 1, the base frame and movable frame are each defined by elongated side beam members that are interconnected by transverse end members and intermediate transverse braces. As shown in FIG. 1, the upper movable frame member 28 comprises elongated side beam members 30 and 32 that are interconnected at each end by transverse end members 34 and 36. A plurality of transverse braces 38 are suitably interconnected with the upper flange portions of the side beams 30 and 32 by bolting, welding or by any other suitable form of connection. The transverse braces 38 are positioned in angulated relation with the side and end members of the movable frame 28 and provide support for a plurality of pipe engaging rollers, some of which are mere idler roller assemblies as shown at 40 and some of which are driven roller assemblies as shown at 42. Each of the roller assemblies, whether an idler roller assembly or a driven roller assembly, incorporates a rotatable pipe engaging roller structure having rollers formed of a wear-resistant, relatively high friction material, such as rubber, which is capable of establishing a supporting and driving relation with pipe engaged thereby. Each of the rollers is of a form defining a large diameter at the end portions thereof and defining inclined tapered roller surfaces that intersect intermediate the extremities thereof and thereby form an essentially V-shaped annular groove. The inclined relationship of each of the rollers with respect to the pipe beam supported thereby pipe supporting and driving engagement to be established at opposed roller surface points that are inclined with respect to the axis of the pipe and in axial registry with respect to the axis of the roller. Thus, upon driving rotation induced by means of the driven roller assemblies 42, the pipe is driven linearly either toward or away from the building structure, depending upon the direction of roller rotation, and the pipe is also driven in rotational manner. The combination of linear and rotational movement effects spiral movement of the pipe as it is moved in either linear direction.

With regard to the base frame structure 24, as shown in FIG. 2, a pair of side frame beams 44 and 46 extend the length of the framework and are interconnected at the ends thereof by means of end members 48 and 50. The brace framework is strengthened by a plurality of intermediate transverse braces 52 which are connected at each extremity thereof to the side beam members 44 and 46. The base framework is also provided with a pair of transverse pivot support braces 54 and 56 which are connected to the side beam members 44 and 46. A pair of compression support members 58 and 60 interconnect the respective pivot support braces 54 and 56 with end member 48 and a transverse structural brace 62, respectively. To provide for connection of a pair of cylinder operators 64 and 66 with the base frame structure, cylinder connector structures 68 and 70 are interconnected, respectively, with the transverse end member 48 and transverse structural brace 62. Each of the cylinder actuators 65 and 66 are adjustably interconnected with the upright cylinder support structures 68 and 70 in the manner illustrated in FIG. 7. An adjustment bolt 72 having a connecting block 74 interconnected therewith is extended through registering apertures 76 defined in the upright cylinder support structure 68. A compression spring 78 surrounds a portion of the adjustment bolt 72 and is interposed between abutment surfaces defined by the upright cylinder support and the connector block 74. A lock nut 80 is received by the bolt 72 and provides for retention of the bolt and connector block in assembly with the upright cylinder support. The nut 80 may be suitably positioned with respect to the threaded length of the adjustment bolt 72 so as to establish desired positioning of the cylinder actuator with respect to the upright cylinder support.

Figure 6:
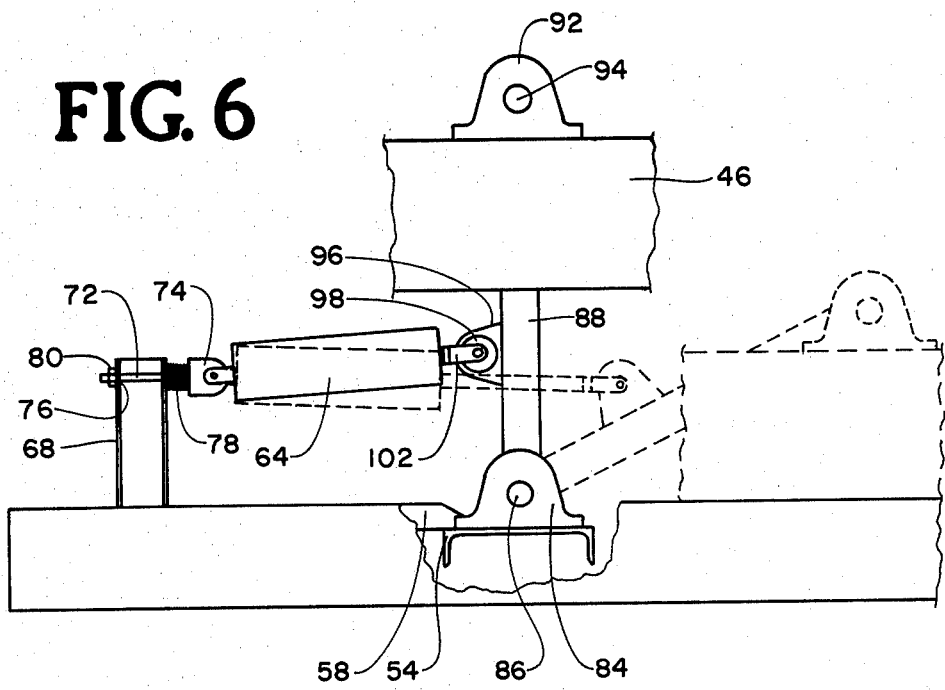
Figure 15:
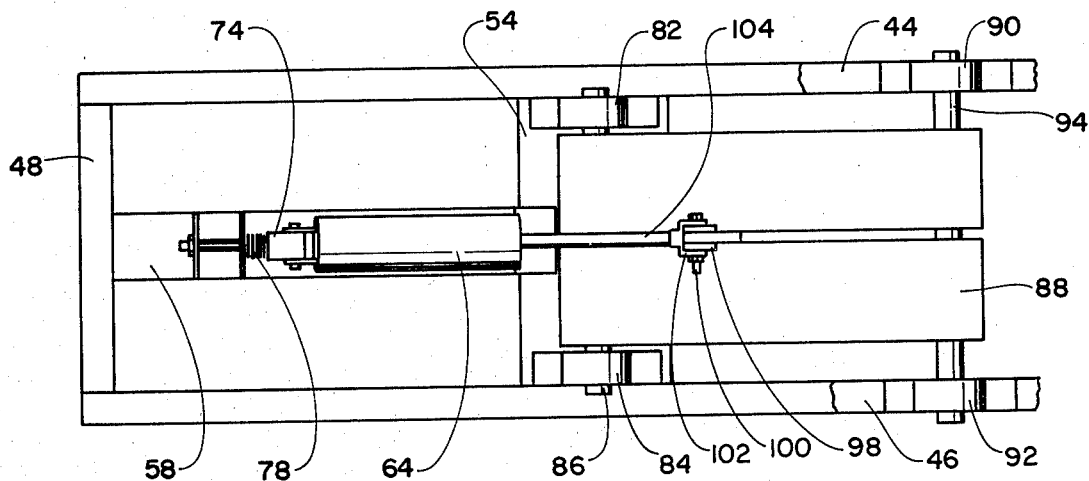
Figure 7:
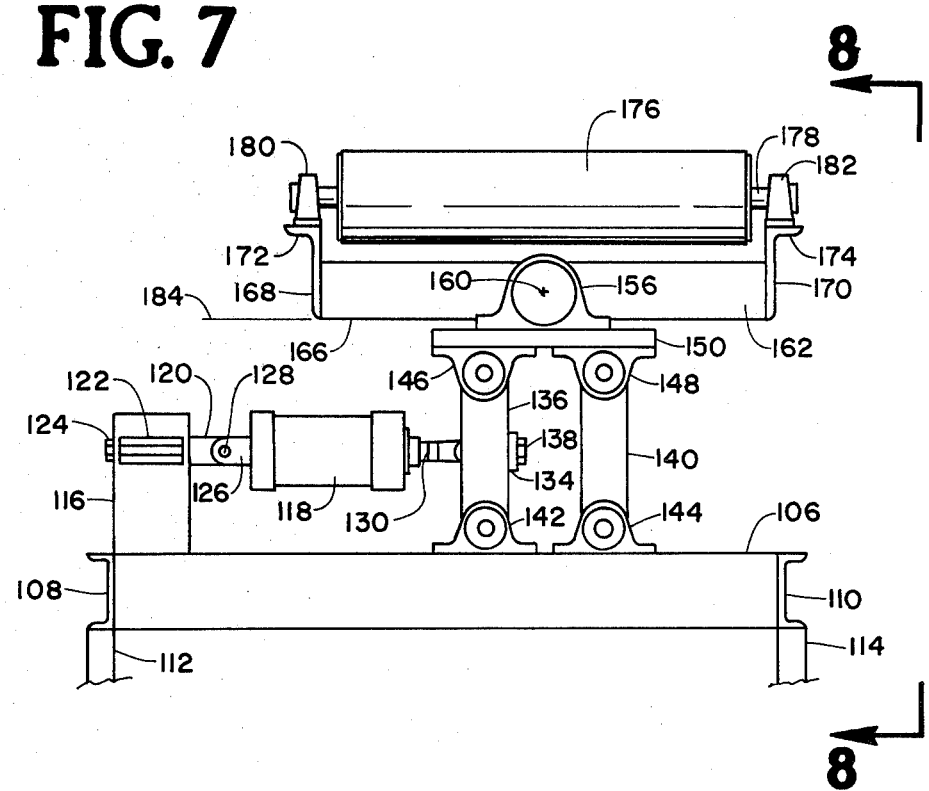

A pair of thrust bearing assemblies 82 and 84 are fixed by bolts or by any other suitable form of connection to each of the transverse structural braces 54 and 56. A pivot shaft 86 extends from each side of the lower portion of a pivotal elevator leg 88 and is received in supported pivotal relation by respective ones of the lower bearings 82 and 84. A pair of thrust bearing assemblies 90 and 92 are connected by bolting or by any other suitable means of connection to respective ones of the side beam members 44 and 46 of the movable frame structure. An upper pivot shaft 94 extends from opposed sides of the upper portion of the elevator leg 88 and is received in pivotal relation by the respective upper bearing members 90 and 92. Thus, the elevator leg 88 is interconnected in pivotal relation with the base frame structure and is also interconnected in pivotal relation with the movable frame structure. An elevator leg connector 96 extends from an intermediate portion of the elevator leg structure 88 and includes a bushing 98 that is adapted to receive a connector bolt 100 that secures the connector clevis structure 102 of a cylinder actuator shaft 104 in pivotal relation to the cylinder connector structure 96. As the cylinder actuator shaft 104 is moved to the left as illustrated in FIG. 7, the actuator shaft, acting through the clevis and elevator leg connection structure, causes pivoting of the elevator leg in a counterclockwise manner about a pivot axis defined by the pivot shaft 86. Pivotal movement of this character causes the elevator leg 88 to shift to a more upright position thereby causing the upper portion of the elevator leg to act through the pivot elements 90 and 92 and pivot shaft 94 to cause the movable frame structure to be elevated with respect to the stationary base frame structure. Because of the pivotal relationship of the elevator leg 88 with respect to the stationary base structure, the movable frame structure will be elevated and will have a certain degree of linear movement during elevating movement of the frame structure. This degree of linear movable frame travel is insignificant, however, since the pipe supported by the movable frame structure is intended to be moved linearly into and out of an operative relationship with the machine apparatus located within the building structure. The pipe elevating movement of the movable frame structure 28 is evident from FIGS. 3, 4 and 5. In FIG. 3, the movable frame structure is shown in its fully lowered position with the pipe support and drive roller elements out of contact with the pipe 20. In FIG. 5, the movable frame structure 28 is shown to be in the fully raised position thereof, supporting the pipe 20 on the respective drive rollers. FIG. 4 illustrates the movable frame structure 28 in a partially lowered position and with the pipe 20 being supported by a pipe rotational support and roller system which is discussed in detail hereinbelow.

Figure 8:
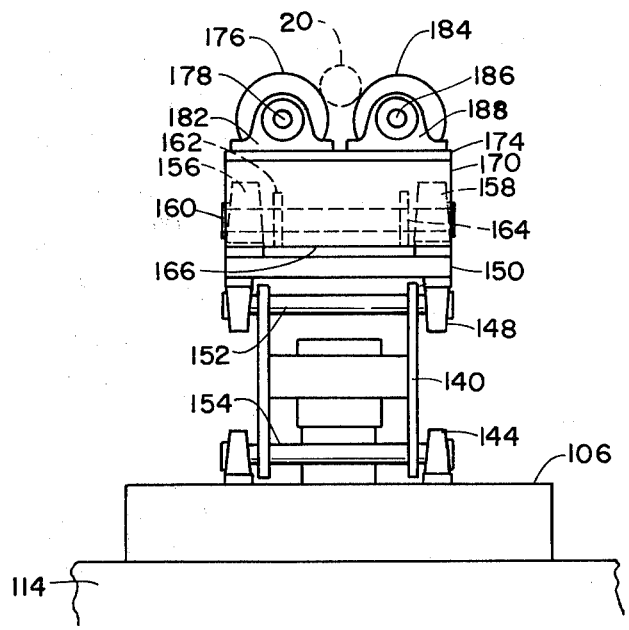
Figure 9:
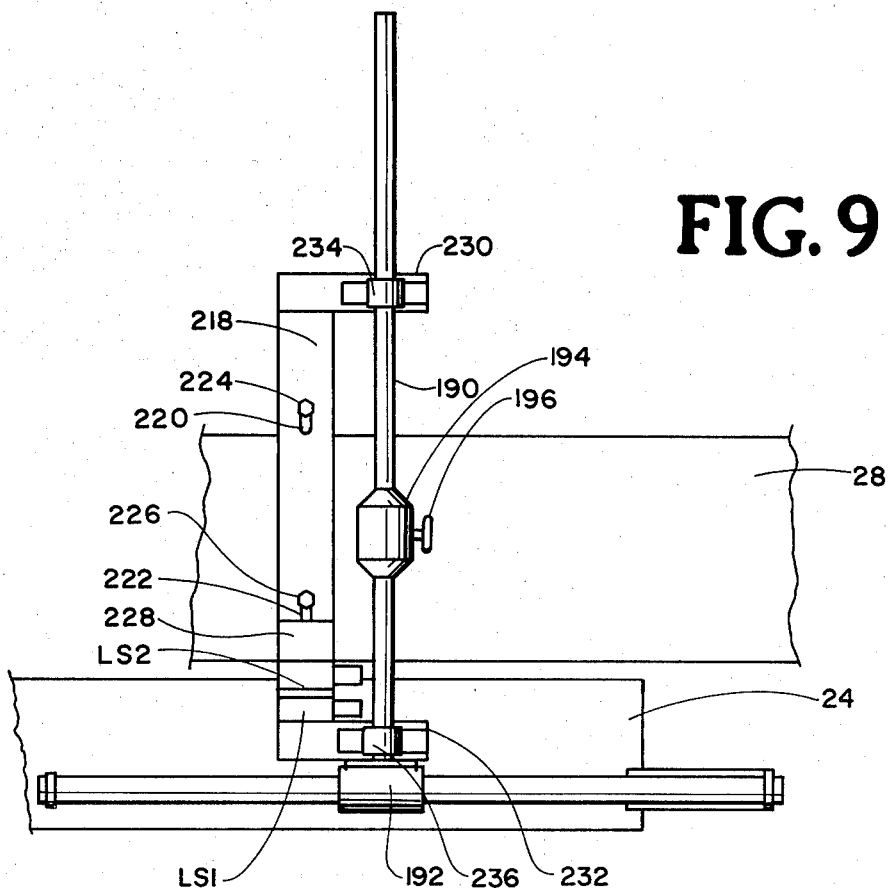
Figure 10:
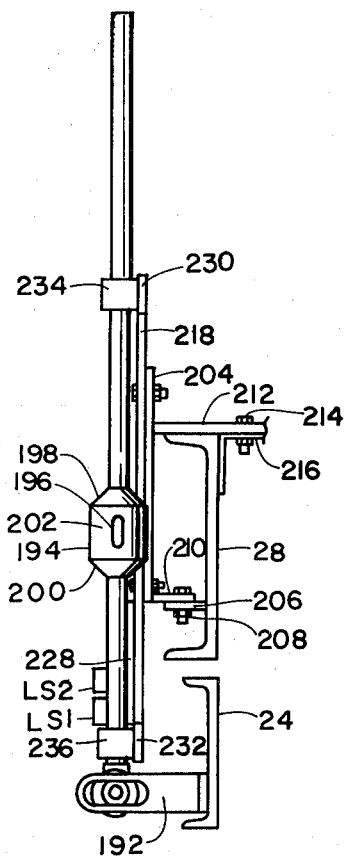

After the pipe 20 has been transferred linearly into the building structure 12, bringing the end portion of the pipe into operative relation with the pipe machining apparatus, it is then desirable to provide rotatable support for the pipe in order that it be capable of rotating during the machining operation. It is desirable, therefore, to move the drive and idler rollers out of contact with the pipe and to provide rotational support for the pipe about an axis that is coincident with the axis of the pipe machining apparatus. In accordance with the present invention, this feature is conveniently accomplished in the manner illustrated in FIGS. 3, 4 and 5 and shown in greater detail in FIGS. 7 and 8. With reference now to FIGS. 7 and 8, a pipe support frame structure is illustrated at 106 which is interconnected in fixed relation to the movable frame structure 28. End structural elements 108 and 110 of the pipe support frame are welded or otherwise suitably interconnected with transverse structural braces 112 and 114 which form a part of the structure of the movable frame 28. An upright cylinder support structure 116 is connected in fixed relation to the frame structure 106 and is adapted to provide support for one end of a cylinder actuator 118. An actuator support element 120 is provided with a connector bolt 122 that extends through apertures in the upright support structure 116 and is interconnected therewith by means of a nut 124 that is received by a bolt 122. The cylinder actuator 118 is provided with a connector structure 126 at one end thereof which is interconnected with connector structure 120 by means of a connector pivot 128. At the opposite extremity of the cylinder actuator is provided an actuator shaft 130 having a connector element 132 that extends through a connector aperture formed in a transverse brace element 134 that is in turn fixed by welding or the like to each of a pair of pivot link elements 136. A nut 138 or other suitable connector structure establishes connection between the actuator shaft and the transverse structural brace 134. A second pair of connector links 140 are provided which are disposed in parallel relation with connector links 136. The lower extremities of each of the connector links is interconnected with the pipe support frame structure 106 by means of bearing elements 142 and 144 while the upper extremities of each of the pairs of connector links are interconnected by bearing structures 146 and 148 to a support plate structure 150. The support plate 150 is maintained in substantially parallel relation with respect to the pipe support frame 106 and the movable frame structure 28 in all positions of the connector links 136 and 140. As shown in FIGS. 7 and 8, the connector links are positioned in upright manner thereby positioning plate 150 in parallel relation with the pipe support frame structure and also positioning the plate 150 at its position of maximum elevation with respect to the pipe support frame. The position illustrated in FIG. 7 is the pipe supporting position which is illustrated in FIG. 5. In FIGS. 3 and 4, the pipe support structure is lowered or partially collapsed by extension of the actuator shaft 130 with respect to the cylinder actuator 118. As shown in FIG. 8, each of the pairs of connector links are interconnected by means of pivot shafts 152 and 154, the respective ends of which are interconnected with respective ones of the bearings 142–148. A pair of roller alignment pivots 156 and 158 are bolted or otherwise connected to the support plate structure 150 and receive a transverse pivot shaft 160 that is also interconnected with a pair of frame members 162 and 164 that form a part of a pivot frame structure 166. The pivot frame structure incorporates a pair of end frame members 168 and 170 having upper flanges 172 and 174, respectively, that provide support for pairs of spaced roller bearings. As shown in FIG. 7, a pipe support roller 176 is provided with a roller support shaft 178 with opposed extremities of the shaft being received by roller bearings 180 and 182. A second roller element 184 is slightly spaced with respect to the pipe support roller 176 and also includes an axial shaft 186 that is supported by means of opposed roller bearings, one of which is shown at 188. With the pairs of links 136 and 140 disposed in the upright position as shown in FIGS. 7 and 8, the spaced pipe suppport rollers 176 and 184 will provide rotatable support for the pipe which is shown in broken line at 20. To ensure positive alignment of the pipe support rollers with respect to the pipe, the transverse pivot shaft 160, being positioned intermediate the extremities of the structural members 162 and 164 of the frame 166, allow the frame 166 to be freely pivotable. The angular tilting capability of the frame 166 is shown by a pair of tilt lines describing a tilt angle represented by an arrow and with the frame 166 being positioned coincidental with a horizontal line shown at 184. The pipe support rollers will therefore engage the pipe and seek optimum supporting relation therewith. Further, the multiple elevator lengths 136 and 140 define a support structure of considerable length that enable extremely heavy pipe or casing to be effectively supported and rotated during machining thereof.

When it is desired to elevate the pipe 20 with respect to the pipe rack and to drive the pipe linearly to or from the machine located within the building structure, the pipe rotational support apparatus must be retracted from engagement with the pipe. As shown in FIGS. 3 and 4, the rotatable pipe support apparatus is lowered by appropriate extension of the cylinder actuator shaft 130. During machining operations it is desirable to support the pipe for rotation but to maintain the pipe out of contact with either the linear drive and support rollers or the pipe rack. In this case, the movable frame structure 28 is partially lowered and the rotatable pipe support apparatus is raised to its upright position, thus positioning the pairs of pivot links 136 and 40 in the upright position thereof in order that the rotatable pipe support apparatus be of maximum load carrying capacity during machining operations. Since the pipe support rollers 176 and 184 are spaced and with the axes thereof maintained in fixed and parallel relation with one another, it is obvious that supporting pipe of differing diameter will position the axes of various diameter pipe in different vertical position with respect to the axes of the roller shafts 178 and 186. In order to position the axis of a supported pipe coincident with the axis of the machine doing work on the pipe, it is necessary to achieve selective vertical positioning of the pipe support rollers 176 and 184. Since it is desirable for purposes of strength to position the connector links 136 and 140 in the vertical position as shown in FIGS. 7 and 8 rather than a partially collapsed position, vertical positioning of the pipe support rollers is therefore accomplished by achieving selective vertical positioning of the movable frame structure 28. It is desirable, therefore, to provide the cylinder actuators 64 and 66 with a hydraulic system incorporating means to detect the position of the movable frame 28 with respect to the base frame structure 24. It is also desirable to provide means for achieving selective positioning of the movable frame relative to the base frame and thereby provide for accommodation of any size pipe that might be machined. In accordance with this invention, position detecting and controlling means of mechanical and electrohydraulic nature is illustrated in FIGS. 9-14. With regard particularly to FIG. 9, an adjustment post structure 190 is shown to be interconnected in fixed relation with the base frame structure 24 by means of a suitable connection bracket 192. A position control collar 194 is adjustably secured with respect to the post 190 by means of a locking element 196. The collar 194 is formed to define upper and lower tapered cam surfaces 198 and 200 that are adapted to be engaged by the operator buttons of a pair of limit switches to be discussed hereinbelow. The collar 194 also defines a cylindrical surface 202 that is also engaged by the operator buttons of the limit switches. If desired, the post 190 may be marked with suitable indicia that allows the operator to quickly and efficiently position the collar 194 in a particular relationship with the post to facilitate handling of pipe of a particular size.

To provide for movement of a pair of limit switches with respect to the post 190 and to ensure proper engagement of the limit switches with the collar 194, a support bracket structure 204 is interconnected with the movable frame structure 28 by suitable means of connection. A connection element 206 is welded or otherwise fixed to the side beam structure of the movable frame 28 and is adapted to receive a bolt 208 that secures a lower connection flange portion 210 of the bracket 204 to the connection element 206. The upper portion of the bracket 204 is secured to the movable frame structure by means of a connection plate element 212 that is secured by bolts 214 to a bracket 216 that is welded or otherwise fixed to the frame structure 28. A vertical positioning plate 218 is formed to define adjustable connection slots 220 and 222 that allow the plate structure 218 to be selectively positioned with respect to the movable frame 28 and secured with respect thereto by means of bolts 224 and 226. To the lower portion of the plate structure 218 is secured a limit switch support plate 228 adapted to provide proper support for a pair of limit switches $LS^1$ and $LS^2$. These limit switches are positioned in spaced relation, the spacing of which is determined by the degree of downward movement of the movable frame 28 that is desired to shift the pipe drive and support rollers out of contact with the pipe to facilitate rotational support of the pipe by means of the pipe support roller mechanism.

It is also desirable to provide a guiding function between the vertical positioning plate 218 and the position adjustment post 190 to ensure proper relation of the limit switches with the adjustment collar 194. For this purpose, upper and lower transverse guide support structures are shown at 230 and 232 which are disposed in fixed relation with the vertical positioning plate 218. Upper and lower guide elements 234 and 236 are interconnected with the respective guide support members with each guide member receiving the guide post 190 in guiding relation therewith. As the movable frame structure 28 is elevated, guide members 234 and 236 are moved upwardly along the post structure 190.

In FIG. 11, the movable frame structure 28 is shown to be in its fully raised position and, under this circumstance, the upper limit switch $LS^2$ is positioned with the control button thereof in engagement with the cylindrical surface 202 of the collar 194. The lower limit switch $LS^1$ is positioned with its control button in engagement with the lower tapered surface 200. In this position, the limit switch 202 is inoperative and control is maintained through the limit switch $LS^1$. As soon as the control button of the lower limit switch $LS^1$ engages the tapered surface 200, the hydraulic circuit controlled by the valve associated with limit switch $LS^1$ causes the hydraulic circuitry to stop the cylinder actuators, thus stopping the elevator mechanism and movable frame structure. In this position, as illustrated in FIG. 4, the pipe drive and support rollers will be in supporting and driving engagement with the pipe and the pipe will be raised from the pipe rack structure 18.

When it is desired to raise the pipe rotational support roller structure and simultaneously lower the movable frame structure 28 such as shown in FIG. 5, the hydraulic circuitry will be energized to lower the frame structure as shown in FIG. 11. When the movable frame 28 is lowered sufficiently that the control button of the lower limit switch $LS^1$ moves out of contact with the cylindrical surface 202 limit switch $LS^1$ activates its control valve thereby causing the hydraulic circuitry to stop lowering movement of the hydraulic cylinders 64 and 66. This feature causes the movable frame 28 to stop at a partially lowered position, positioning the pipe drive and support rollers thereof out of contact with the pipe. In this condition of the control circuitry, the pipe rotation support roller mechanism is elevated and supporting the pipe for rotation by the pipe working machine positioned within the building structure.

Referring now to FIG. 12, a schematic illustration of hydraulic circuitry is presented wherein a hydraulic pump 238 has a suction line 240 communicating with a reservoir 242 for a quantity of hydraulic fluid. The hydraulic pump 238 is driven by an electric motor 244 to supply pressurized hydraulic fluid to a discharge conduit 246 that is interconnected with a fluid supply manifold conduit 248. A motor rotational control valve 250 is in communication with the manifold conduit 248 and provides controlled supply of hydraulic fluid to a motor operation supply conduit 252 having a restrictor valve 254 to provide an adjustably controlled flow of hydraulic supply fluid to a plurality of rotary hydraulic motors 256, 258 and 260 that are interconnected in series by supply conduits 262 and 264. The rotary motors 256–260 provide for selective control of the direction of rotation of the various pipe drive rollers of the apparatus. The valve 250 is adapted to reverse the flow through these motors and thereby reverse the direction of rotation of the drive rollers as is necessary for driving the pipe to or from the building structure. A combination return and supply conduit 266 is also controlled by means of a restrictor valve 268 and directionally controlled flow of hydraulic fluid in this line is controlled by the selector valve 250. A return conduit 270 is interconnected with a return manifold conduit 272 for the purpose of conducting hydraulic fluid back to the reservoir 242.

For operation of the movable frame elevating mechanism, a supply conduit 274 is interconnected with manifold conduit 280 and is provided with a restrictor control valve 276 that enables a controlled supply of hydraulic fluid to be transmitted to a hydraulic selector valve 278 and thence to a fluid control selector 290 through a conduit 292. Conduits 294 and 296 are each interconnected with the fluid control selector 290 and provide for selective supply of hydraulic fluid through conduits 294 or 296 for double acting controlled movement of the hydraulic cylinders 64 and 66.

For operation of the pipe rotational support mechanism, a hydraulic fluid restrictor valve 298 is interconnected with the manifold conduit 248 and provides a controlled supply of hydraulic fluid through a conduit 300 to a selector valve 302 which is adapted to provide controlled supply of hydraulic fluid through combination supply and return lines 304 and 306 for selective operation of the double acting hydraulic cylinder 118.

The various selector valves 250, 278 and 302 are energized electrically by manual or automatic controlled electrical circuitry or a combination thereof to achieve selective operation of the pipe drive motors 256, 258 and 260 and to achieve selectively controlled operation of the hydraulic cylinders 64 and 66 for control of the movable frame 28 and the hydraulic cylinder 118 for control of the pipe rotational support roller mechanism.

With regard now to FIG. 13, an electrical schematic diagram is illustrated depicting the operation and control circuitry for the pipe handling mechanism of this invention. A pair of power and control conductors 310 and 312 are connected by contacts 314 and 316 to a suitable source of electrical energy such as 230 volt A.C. A conveyor selector circuit 318 is connected across conductors 310 and 312 which circuit incorporates limit switch $LS^1$ and a manually operable conveyor up selector switch 320 that allows circuit 318 to be manually energized. The holding circuitry 322 is provided which incorporates a relay contact 1K1 which is closed by activation of a relay K1 when the circuit 318 is energized. A run a set switch 324 is also incorporated within the holding circuit 322 and, being normally closed, is operative to be energized a circuit 318 upon being opened. An indicator light circuit 326 is provided having a red indicator light which is energized only when limit switch $LS^1$ is positioned to deenergize the conveyor up control circuit 318. A circuit 328 is also interconnected across the supply conductor 310 and 312 and is provided for the purpose of controlling positioning of the pipe rotational support mechanism of FIGS. 7 and 8. Circuit 328 incorporates a manually controlled switch 330 through which a holding circuit 332 is activated to energize a relay K2, causing normally open contacts 1K2 to close and maintain the energized condition of the relay. A limit switch $LS^2$ is also incorporated within the circuit 328 and is shown in the open position which deenergizes the relay K2 and energizes an indicator circuit 334 incorporating a green indicator light. Circuit 334 incorporates a relay contact 2K3 which is closed upon activation of a relay K3 incorporated within a control circuit 336. The relay K3 is capable of being energized only when the relay contact 3K4 is closed and therefore, when the conveyor down relay K4 is energized, relay K3 cannot be energized. Upon activation of the relay K3, a normally open relay contact 1K3 will be closed and, assuming relay K1 is deenergized, the circuit 336 will be energized through normally closed relay contact 2K1 from the circuit 328.

For activation of a conveyor down circuit 338, a normally closed relay contact 4K3 must be closed and therefore relay K3 must be deactivated at this point. The conveyor down circuit 338 is energized upon closure of a manually operable switch 340 to cause energization of a relay K4 which closes normally open contacts to K4 and energizes a holding circuit 342. The holding circuit incorporates a set-run switch 344 that is operated under control of limit switch LS1.

Another set-run switch 346 in a circuit 348 is operative only under circumstances where the normally open relay 4K4 of the circuit is closed responsive to energization of relay K4 of the conveyor down circuit 338. With the relay contact 4K4 closed and with set-run switch 346 closed, the circuit 348 will be energized, thereby activating the hydraulic valve solenoid 2SB1 of the hydraulic control valve 302, thereby causing the pipe rotational support mechanism to be raised by extension of the actuating shaft of the hydraulic cylinder 118. When it is desired for the pipe support roller mechanism to be lowered, the solenoid valve 1SV1 is energized by energizing circuit 319 simultaneously with energization of relay control circuit 318. A solenoid valve control circuit 350 is interconnected across the relay K3 and supply conductor 316 and thus the solenoid 1SV2 of the control valve 278 is energized to cause the hydraulic cylinders 64 and 66 to retract the operating shafts thereof and cause the movable conveyor frame structure to move downwardly. Upward movement of the movable frame structure 28 is induced by activation of solenoid valve 1SV1 of circuit 319 simultaneously with energization of the relay control circuit 318.

Selective operation of the drive roller motors is accomplished by selective energization of motor operation circuits 352 or 354 which are capable of operation only when the relay K5 is energized by the red indicator light circuit 326. Activation of relay K5 causes normally open contacts 1K5 and 2K5 to close, thus allowing the circuits 352 and 354 to be selectively energized upon selective closure of the manually operable switches 356 or 358.

In view of the foregoing, it is apparent that the present invention is adapted to attain all of the objects and features hereinabove set forth, together with other features that are inherent from the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof. It is to be understood that all matters hereinabove set forth or shown in the accompanying drawings are to be interpreted as illustrative and not in any limiting sense.

What is claimed is:

1. A pipe handling mechanism for selectively transporting lengths of pipe from a horizontal pipe rack, transporting the pipe linearly from the pipe rack to apparatus doing work on the lengths of pipe and returning the worked pipe to the pipe rack, said pipe handling mechanism comprising:
a base structure;
a pipe elevation frame;
first elevator means being a plurality of elevator leg structures being pivotally interconnected at the lower extremities thereof to said base and pivotally interconnected at the upper extremities thereof to said pipe elevation frame;
first power means for selectively and controllably moving said elevator leg structures and causing selective raising and lowering of said pipe elevation frame relative to said base structure;
a plurality of angulated pipe transfer rollers being rotatably supported by said pipe elevation frame and adapted, when rotated, to impart spiral linear movement of pipe supported thereby;
means for imparting controlled rotation to at least one of said angulated pipe transfer rollers;
pipe alignment and support roller means;
second elevator means being pivotal support means pivotally interconnected at the lower extremities thereof to said pipe elevation frame and pivotally interconnected at the upper extremities thereof to said pipe alignment and support roller means;
second power means for controllably moving said pipe alignment and work support means;
control means selectively actuating said first and second power means to elevate pipe from a pipe rack to a selected elevation, transfer the pipe linearly to accomplish working thereof, elevate said pipe alignment and support roller means to provide rotatable support for said pipe and retract said pipe transfer rollers from contact with said pipe during working of said pipe.

2. A pipe handling mechanism as recited in claim 1, wherein:
said first and second power means are linear hydraulic motors; and
said control means is an electrohydraulic circuit achieving selective power activation of said linear hydraulic motors.

3. A pipe handling mechanism as recited in claim 1, wherein each of said angulated pipe transfer rollers comprises:
a roller body being rotatable about an axis that is positioned in angulated relation to the longitudinal axis of pipe being supported and driven thereby; and
tapered opposed pipe engaging surfaces being defined on each side of said roller body, said pipe engaging surfaces contacting said pipe along separate spiral paths during linear transfer of said pipe.

4. A pipe handling mechanism as recited in claim 2, wherein said elevator leg structures comprise:
elongated structural leg means defining upper and lower extremities;
first pivot means interconnecting the lower extremities of said leg means to said base structure;
second pivot means interconnecting said the upper extremities of said leg means to said pipe elevation frame;
motor connector means being positioned intermediate the extremities of said structural leg means; and
said first power means being motor means interconnected with said motor connector means and being operative to cause pivotal movement of said structural leg means about said first pivot means and thus induce vertical movement to said pipe elevation frame.

5. A pipe handling mechanism as recited in claim 4, wherein:
said motor means comprise linear hydraulic motor means for each of said structural leg means, said hydraulic motor means being simultaneously energized for raising and lowering said pipe elevation frame.

6. A pipe handling mechanism as recited in claim 1, wherein said second elevator means comprises:
a plurality of elevator links defining upper and lower extremities;
first pivot means establishing pivotal interconnection of said elevator links with said pipe elevator frame;
second pivot means establishing pivotal interconnection of said elevator links with said pipe alignment and support roller means; and
said second power means being interconnected with at least one of said elevator links and, upon being selectively energized, causing pivotal movement of said elevator links about said pipe elevator frame causing elevation movement of said pipe alignment and support roller means, said connector links maintaining said pipe alignment and support roller means in substantially parallel relation with said pipe elevator frame during elevation movement thereof.

7. A pipe handling mechanism as recited in claim 6, wherein said pipe alignment and support roller means comprises:
platform means;
a pair of support rollers being supported in parallel spaced relation by said platform means and each roller adapted for supporting engagement by a pipe, said support rollers being freely rotatable and allowing rotation of said pipe during support thereof; and
platform pivot means being positioned intermediate said platform means and establishing a pivot axis extending in substantially normal relation to the longitudinal axis of said pipe, said platform being freely pivotal about said pivot axis.

8. A pipe handling mechanism as recited in claim 7, wherein:
said first and second power means are defined by linear hydraulic motors;
hydraulic circuitry for accomplishing selective energization of said linear hydraulic motors; and
electrical circuitry for accomplishing selective control and operation of said hydraulic circuitry.

9. A pipe handling mechanism as recited in claim 1, wherein said pipe handling mechanism incorporates adjustable positioning control means for achieving selective elevational positioning of said pipe elevation frame, said adjustable positioning control means comprising:
support structure being interconnected with said pipe elevation frame and being movable therewith;

a pair of electrical limit switches being supported in spaced, vertically spaced relation on said support structure;

a position adjustment post being interconnected at the lower extremity thereof with said base structure; and an adjustment collar being received by said position adjustment post and being selectively positionable along the length, said adjustment collar defining control surface means, said limit switches being engageable with said control surface means for controlling energization of electrical control circuitry for actuation of said first and second power means.

10. A pipe handling mechanism as recited in claim 9, wherein said pipe alignment and support roller means comprises:

platform means;

a pair of support rollers being supported in parallel spaced relation by said platform means and each roller adapted for supporting engagement by a pipe, said support rollers being freely rotatable and allowing rotation of said pipe during support thereof; and platform pivot means being positioned intermediate said platform means and establishing a pivot axis extending in substantially normal relation to the longitudinal axis of said pipe, said platform being freely pivotal about said pivot axis.

11. A pipe handling mechanism as recited in claim 10, wherein:

said first and second power means are defined by linear hydraulic motors;

hydraulic circuitry for accomplishing selective energization of said linear hydraulic motors; and electrical circuitry for accomplishing selective control and operation of said hydraulic circuitry.

12. A pipe handling mechanism as recited in claim 10, wherein:

said hydraulic circuitry incorporates a rotary power control section including rotary hydraulic motor means and solenoid energized valve means for achieving selective directional operation of said rotary hydraulic motor means, said rotary hydraulic motor means defining said means for imparting controlled rotation to at least one of said angulated pipe transfer rollers.

13. A pipe handling mechanism as recited in claim 12, wherein:

said hydraulic circuitry incorporates a pipe elevator control section including first linear hydraulic motor means and solenoid energized valve means for achieving selective hydraulic energization of said first linear hydraulic motor means for raising and lowering said pipe elevation frame relative to said base structure, said first linear hydraulic motor means comprising said first power means.

14. A pipe handling mechanism as recited in claim 13, wherein:

said hydraulic circuitry incorporates a pipe alignment and rotational support section including second linear hydraulic motor means and solenoid energized valve means for achieving selective hydraulic energization of said second linear hydraulic motor means for raising and lowering said pipe alignment and support roller means relative to said pipe elevation frame.

15. A pipe handling mechanism as recited in claim 1, including:

indicator means indicating axial alignment of the centerline of said pipe with respect to a known height.

* * * * *